US012717258B2

(12) United States Patent
Kaku

(10) Patent No.: US 12,717,258 B2
(45) Date of Patent: Aug. 25, 2026

(54) IMAGE FORMING APPARATUS

(71) Applicant: SHARP KABUSHIKI KAISHA, Osaka (JP)

(72) Inventor: Yuichi Kaku, Osaka (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/940,658

(22) Filed: Nov. 7, 2024

(65) Prior Publication Data

US 2025/0155843 A1 May 15, 2025

(30) Foreign Application Priority Data

Nov. 10, 2023 (JP) ................................ 2023-192405

(51) Int. Cl.

*G03G 15/00* (2006.01)
*G03G 15/02* (2006.01)
*G03G 15/08* (2006.01)
*G03G 15/16* (2006.01)

(52) U.S. Cl.

CPC ......... *G03G 15/55* (2013.01); *G03G 15/0216* (2013.01); *G03G 15/0855* (2013.01); *G03G 15/167* (2013.01); *G03G 15/5054* (2013.01)

(58) Field of Classification Search

CPC ..... G03G 15/02–0216; G03G 15/0855; G03G 15/1665; G03G 15/167; G03G 15/5054; G03G 15/55

See application file for complete search history.

(56) References Cited

U.S. PATENT DOCUMENTS 5,596,395 A * 1/1997 Sawamura ........... G03G 15/167 399/168
2015/0104213 A1* 4/2015 Tajiri ................ G03G 15/1615 399/121
2022/0244671 A1* 8/2022 Hatano ................ G03G 15/161
2023/0266692 A1* 8/2023 Otsuka ................ G03G 15/065 399/50
2023/0341792 A1* 10/2023 Kaku .................. G03G 15/043

FOREIGN PATENT DOCUMENTS

JP 2012-063555 A 3/2012
JP 2019-008094 A 1/2019

* cited by examiner

*Primary Examiner* — Carla J Therrien
(74) *Attorney, Agent, or Firm* — ScienBiziP, P.C.

(57) ABSTRACT

An image forming apparatus includes: an image forming section; and one or more controllers that control the image forming section. At the time of start-up of the image forming section, the one or more controllers perform predetermined determination processing by which both a contact state between a photoreceptor and a transfer section and a contact state between the photoreceptor and a charging section are determined, when determining that the photoreceptor is in the contact state with the transfer section and the photoreceptor is in the contact state with the charging section, the one or more controllers determine normality, and when determining that the photoreceptor is not in the contact state with the transfer section or the photoreceptor is not in the contact state with the charging section, the one or more controllers determine that abnormality has occurred and limit operation of the image forming section to a predetermined operation.

5 Claims, 14 Drawing Sheets

IMAGE FORMING APPARATUS

CROSS-REFERENCE TO RELATED APPLICATION

The present application claims priority from Japanese Application JP2023-192405, the content of which is hereby incorporated by reference into this application.

BACKGROUND OF THE INVENTION

1. Field of the Invention

The present disclosure relates to an image forming apparatus.

2. Description of the Related Art

In some image forming apparatuses in which a charging roller charges a photoreceptor, which is an image carrier, a mechanism (hereinafter, referred to as separation mechanism) is provided to separate the photoreceptor and the charging roller in a releasable manner so that the photoreceptor and the charging roller do not physically come into contact with each other at the time of shipment of the image forming apparatuses from a factory.

Further, in some image forming apparatuses in which a photoreceptor and a charging roller are configured as a replaceable unit (hereinafter, referred to as a process unit), a separation mechanism that can separate the photoreceptor and the charging roller in a releasable manner as in the one described above is provided so that the photoreceptor and the charging roller do not physically come into contact with each other at the time of shipment of a process unit for replacement from a factory.

This is to avoid the image quality from being affected due to the fact that when the charging roller is continuously pressed in contact with the photoreceptor, the corresponding section of the photoreceptor is physically or chemically damaged.

In addition, in forming an image, the charging roller needs to be brought into contact with the photoreceptor in order to charge the surface of the photoreceptor. Accordingly, the separation mechanism is provided with a canceling mechanism that cancels separation at the start of initial driving of the photoreceptor and brings the charging roller into contact with the photoreceptor.

On the other hand, when a malfunction occurs in the canceling mechanism, the charging roller and the photoreceptor may remain separate. In such a case, the photoreceptor is not charged during operation for image forming.

Recently, in typical electrophotographic image forming apparatuses that form (also, that may develop) toner images on the photoreceptor, toner selectively adheres to areas (originally to exposed areas) where the photoreceptor is not charged. Therefore, when the canceling mechanism does not operate to cause the charging roller to remain separate and thus the photoreceptor is not charged, a toner image (solid image) is formed over the entire surface of the photoreceptor instead of a toner image that is supposed to be formed with the toner originally adhered only to exposed areas. Consequently, the toner may be consumed wastefully. As a result, the area around the photoreceptor may be contaminated with scattered toner.

In order to solve the problem described above, a known separate state determination device including a determiner is proposed in which the determiner determines a separate state between a charging roller and a photoconductor drum after start of use.

The known separate state determination device includes a separator that brings an image carrier (a photoreceptor) and a charger (a charging roller) into a separate state before start of use and into a contact state after start of use. The determiner applies, to the charger, a first bias lower than that when charging the image carrier, and determines a separate state of a process cartridge (whether the process cartridge is new in the separate state or is unmounted or is old after cancellation of separation) from the value of the current flowing at that time. When it is determined that the process cartridge is new or unmounted, the determiner further applies a second bias greater than the first bias, and determines whether the process cartridge is new or unmounted from the value of the current flowing through the charger at that time.

Further, a known image forming apparatus including a determiner is proposed in which the determiner determines a contact/separate state of a secondary transfer member and a toner charging member with respect to an intermediate transfer body. The determiner forms a detection pattern X on the intermediate transfer body and determines, with a current detector, the current flowing through the secondary transfer member and the toner charging member when the detection pattern X passes through the secondary transfer member and the toner charging member in a state where a voltage is applied to the secondary transfer member and the toner charging member, and thus the determiner determines the contact/separate state from the number of times the current value has changed to a predetermined threshold value or higher.

Furthermore, a method is also known in which photoreceptors are driven for a predetermined time such that toner images can be confirmed at the time of driving, and whether or not KCMY toner images are present is determined based on a detection value of an image density sensor in accordance with a time at which the toner images are expected to come when the photoreceptors are separated, thereby confirming that all of the photoreceptors for KCMY and charging rollers are in a pressure contact state.

SUMMARY OF THE INVENTION

However, in the method in which whether or not the KCMY toner images are present is determined based on a detection value of the image density sensor, when an intermediate transfer body is not disposed properly at the time of detection of a contact state of the photoreceptors and the charging rollers, the toner images are not transferred to the intermediate transfer body, which may cause a wrong detection of a pressure contact state between the photoreceptors and the charging rollers.

In this case, the photoreceptors are not charged, and thus the toner images are continuously transferred to the entire surfaces of the photoreceptors, which may cause problems such as consumption of a large amount of toners and contamination of a process unit.

One aspect of the present disclosure is thus made in view of the circumstances described above and is intended to provide an image forming apparatus that can determine not only a contact state between a photoreceptor and a charging roller but also a contact state between the photoreceptor and a transfer section more efficiently than a known image forming apparatus.

An aspect of the present disclosure provides an image forming apparatus that includes: an image forming section including a photoreceptor, a charging section that comes into contact with the photoreceptor to charge the photoreceptor, an exposure section that forms an electrostatic latent image on the photoreceptor, a developing section that supplies toner to the photoreceptor to form a toner image corresponding to the electrostatic latent image, a transfer section that transfers the toner image to a storage medium, a toner concentration sensor that detects concentration of the toner image transferred to the transfer section, and a fixing section that thermally fixes the toner image to the storage medium; and one or more controllers that control the image forming section. At the time of start-up of the image forming section, the one or more controllers perform predetermined determination processing by which both a contact state between the photoreceptor and the transfer section and a contact state between the photoreceptor and the charging section are determined. When determining that the photoreceptor is in the contact state with the transfer section and the photoreceptor is in the contact state with the charging section, the one or more controllers determine normality and start up the image forming section, and then shift the apparatus to a predetermined standby state. In contrast, when determining that the photoreceptor is not in the contact state with the transfer section or the photoreceptor is not in the contact state with the charging section, the one or more controllers determine that abnormality has occurred and limit operation of the image forming section to a predetermined operation.

According to an aspect of the present disclosure, the image forming apparatus that can determine not only a contact state between the photoreceptor and the charging roller but also a contact state between the photoreceptor and the transfer section more efficiently than a known image forming apparatus can be attained.

DETAILED DESCRIPTION OF THE INVENTION

Figure 1:
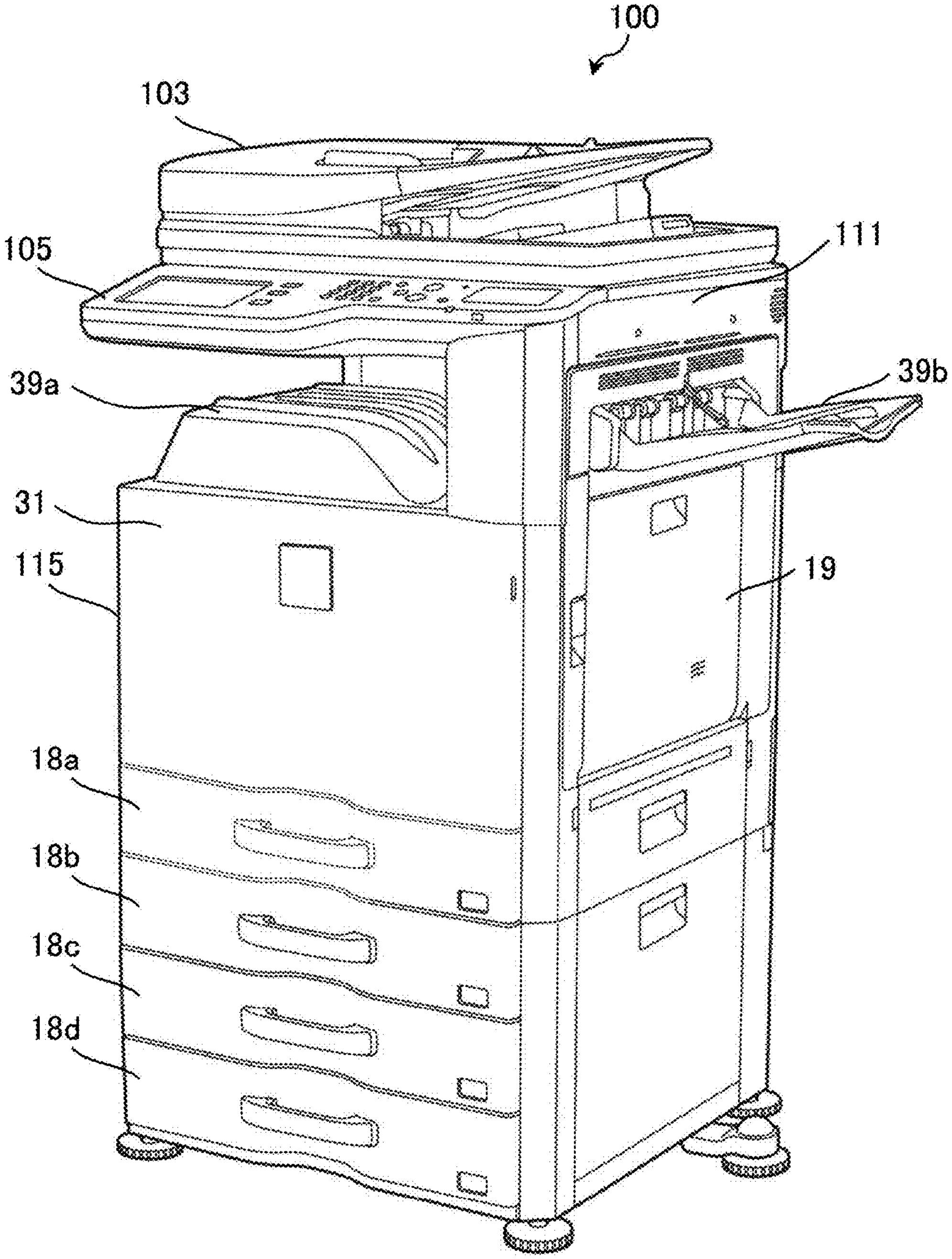
FIG. 1 is a perspective view illustrating an external appearance of a digital multifunction machine that is one embodiment of an image forming apparatus according to the present disclosure.

Preferred modes of the present disclosure will be further described.

In the present disclosure, an "image forming apparatus" is an apparatus that forms an image and outputs the image. Examples of the image forming apparatus are a copying machine and a multifunction machine that have a reproduction (copy) function, such as a printer using an electrophotographic method for forming an image with toner, or a multifunctional peripheral (MFP) that has other functions in addition to the reproduction function.

A "photoreceptor" is not limited to a photoconductor drum, and may have any shape as long as the surface is charged.

"To limit operation of an image forming section to a predetermined operation" is, for example, a case in which the operation of the image forming section is limited to a predetermined operation related to other functions without image formation such as formation of image data by scanning.

The "photoreceptor" of the present disclosure is implemented by a photoconductor drum 13. Further, a "charging section" of the present disclosure is implemented by a charging roller 14. Furthermore, an "exposure section" of the present disclosure is implemented by an optical scanning unit 11.

In addition, a "developing section" of the present disclosure is implemented by a developing unit 12.

Further, a "transfer section" of the present disclosure is implemented by an intermediate transfer belt 21.

Furthermore, the "image forming section" of the present disclosure is implemented by a printer 115.

In the image forming apparatus according to the present disclosure, when determining normality as a result of the determination processing, the controller may not perform the determination processing from the next start-up of the image forming apparatus. In contrast, when determining that abnormality has occurred, the controller may perform the determination processing from the next start-up of the image forming apparatus.

Thus, when normality has been determined, the determination processing does not need to be performed from the next start-up of the image forming apparatus. As a result, the image forming apparatus that can determine not only a contact state between the photoreceptor and the charging roller at the time of an initial start-up of the image forming apparatus but also a contact state between the photoreceptor and the transfer section more efficiently than a known image forming apparatus can be attained.

In the image forming apparatus according to the present disclosure, the controller may control the charging section, the exposure section, the developing section, and the transfer section to transfer a predetermined patch toner image to the transfer section, and then may cause the toner concentration sensor to detect concentration of the patch toner image, and may determine, based on the detection result, the contact state between the photoreceptor and the transfer section and the contact state between the photoreceptor and the charging section.

Thus, the image forming apparatus that can determine, based on the detection result of the concentration of the patch toner image, not only a contact state between the photoreceptor and the charging roller but also a contact state between the photoreceptor and the transfer section more efficiently than a known image forming apparatus can be attained.

In the image forming apparatus according to the present disclosure, the patch toner image may include a striped pattern in which the predetermined number of toner images having a predetermined width in a main scanning direction are repeatedly arranged at predetermined intervals in a subscanning direction.

Thus, the image forming apparatus that can determine, based on the detection result of the concentration of the patch toner image having the predetermined striped pattern, not only a contact state between the photoreceptor and the charging roller but also a contact state between the photoreceptor and the transfer section more efficiently than a known image forming apparatus can be attained.

In the image forming apparatus according to the present disclosure, when toner images and blanks are alternately repeated in the pattern of the patch toner image detected by the toner concentration sensor, the controller may determine normality. When only toner images are continuous and blanks cannot be confirmed, the controller may determine that abnormality of no contact of the charging section with the photoreceptor has occurred, and when only blanks are continuous and toner images cannot be confirmed, the controller may determine that abnormality of an unmounted state of the transfer section has occurred.

Thus, the image forming apparatus that can determine, based on the confirmation result of the toner images and the blanks in detection of the concentration of the patch toner image having the predetermined striped pattern, not only a contact state between the photoreceptor and the charging roller but also a contact state between the photoreceptor and the transfer section more efficiently than a known image forming apparatus can be attained.

In the image forming apparatus according to the present disclosure, the image forming section may form images according to toner images of a plurality of colors. When supplying power to the image forming section for start-up, the controller may perform predetermined determination processing of determining both a mounted state of the transfer section and the contact state between the photoreceptor and the charging section for the toner images of the respective colors. When determining as a result of the determination processing that abnormality has occurred in the only one color, the controller may not start up the image forming section and may cause the power supply controller to stop the power supply to the image forming section.

Thus, the image forming apparatus that can determine, at the time of forming images according to toner images of a plurality of colors, not only a contact state between the photoreceptor and the charging roller but also a contact state between the photoreceptor and the transfer section for the toner images of the respective colors more efficiently than a known image forming apparatus can be attained.

The present disclosure will be further described below in detail with reference to the drawings. Note that the following description is illustrative in every aspect, and is not to be construed as limiting the present disclosure.

First Embodiment

Configuration Example of Image Forming Apparatus

FIG. 1 is a perspective view illustrating an external appearance of a digital multifunction machine 100 that is one embodiment of an image forming apparatus according to the present disclosure.

Figure 2:
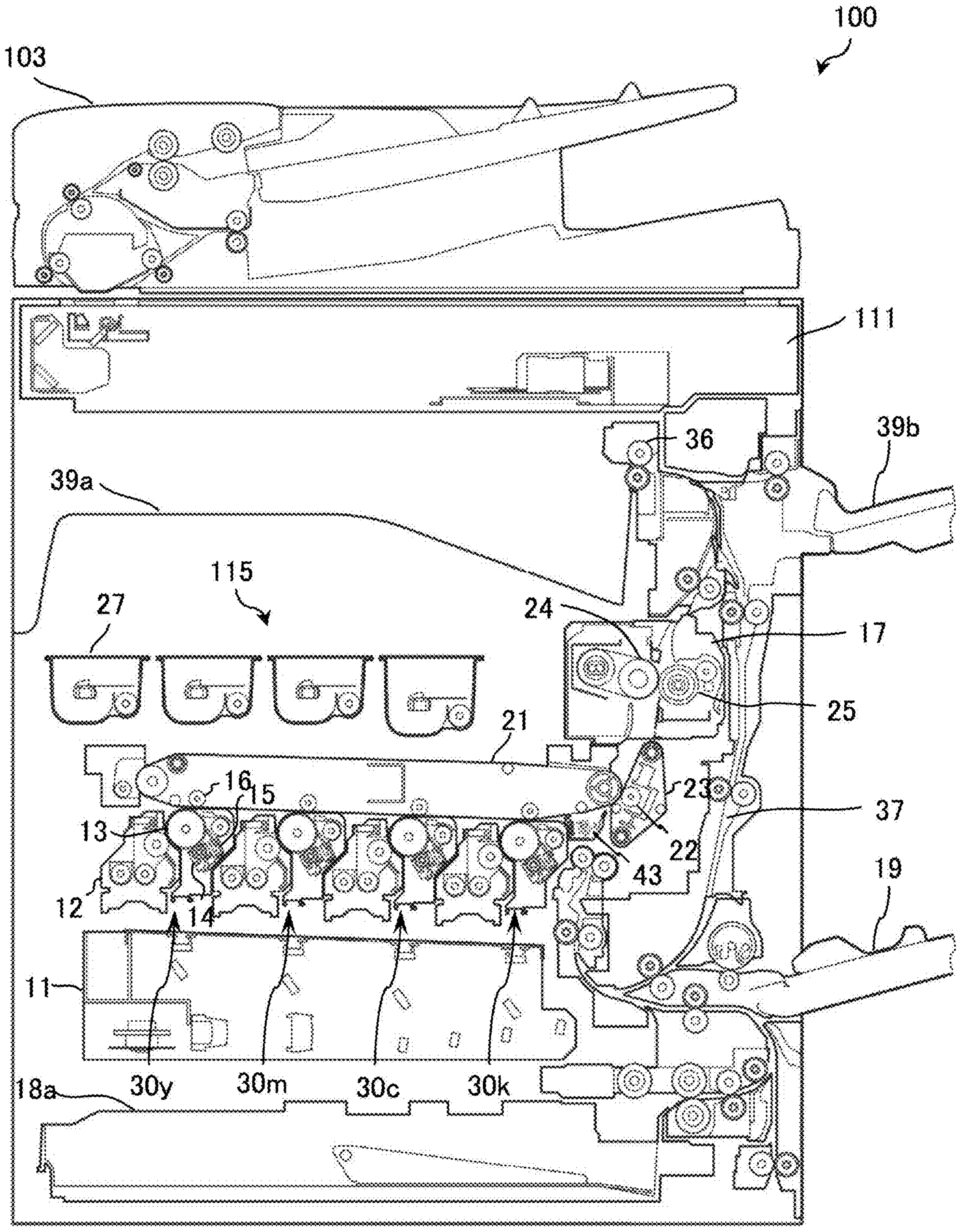
FIG. 2 is an explanatory diagram illustrating an internal structure for image formation of the digital multifunction machine illustrated in FIG. 1.

FIG. 2 is an explanatory diagram illustrating an internal structure for image formation of the digital multifunction machine 100 illustrated in FIG. 1.

Figure 3:
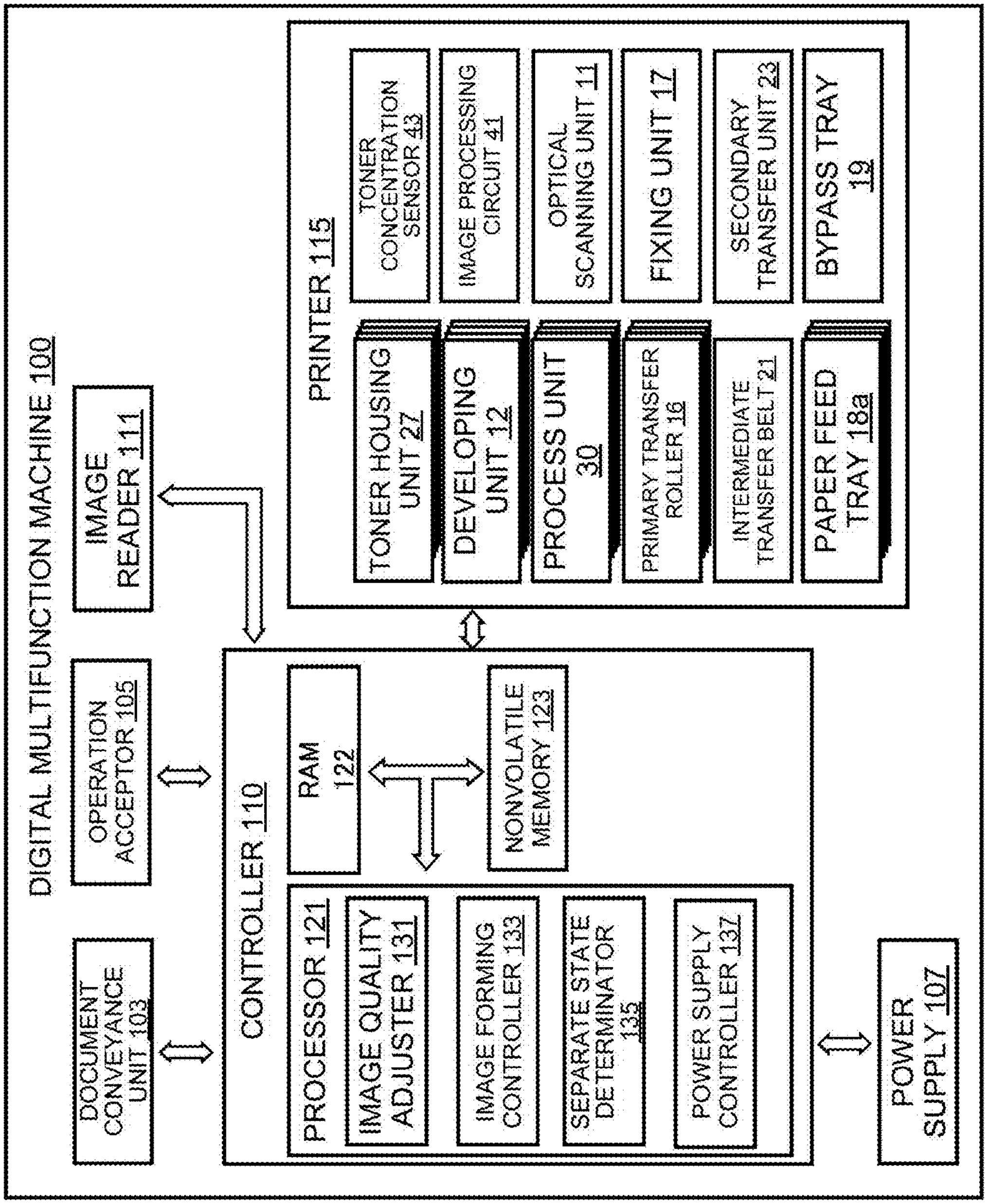
FIG. 3 is a block diagram illustrating elements related to control in the digital multifunction machine illustrated in FIG. 1.

FIG. 3 is a block diagram illustrating elements related to control in the digital multifunction machine 100 illustrated in FIG. 1.

As illustrated in FIG. 1, the digital multifunction machine 100 includes, in its main body, an image reader 111 that reads documents, an operation acceptor 105 that accepts user operations, and a printer 115 that forms images. Further, a paper feed tray 18*a* is provided below the printer 115. A discharge tray 39*a* is provided above the printer 115 and below the image reader 111, and a discharge tray 39*b* is provided on a right side surface portion. Furthermore, a front door 31 that is an openable/closable main body cover is provided on the front side. FIG. 1 illustrates a state where the front door is closed.

In addition, a document conveyance unit 103 that conveys documents to the reader is provided on the upper side of the main body. A paper feed desk including the paper feed trays 18*b*, 18*c*, and 18*d* in which print sheets are housed is provided on the lower side of the main body.

Here, the internal structure for image formation of the digital multifunction machine 100 illustrated in FIG. 2 will be described.

The digital multifunction machine 100 forms four-color toner images of yellow (Y), magenta (M), cyan (C), and black (K) through an electrophotographic process, superimposes the toner images on the intermediate transfer belt 21, and prints a color image on a print sheet. Alternatively, a monochrome image using a single color (e.g., black) is printed on a print sheet. Accordingly, the printer 115 is provided with four process units 30 each including the developing unit 12, the photoconductor drum 13, the charging roller 14, a drum cleaner 15, and the likes therein. The process unit includes the photoconductor drum 13 and the charging roller 14. In addition, the optical scanning unit 11 that scans and exposes the photoconductor drum 13 corresponding to each color with a laser beam is disposed.

The digital multifunction machine 100 includes process units 30*y*, 30*m*, 30*c*, and 30*k* for the respective colors, but in FIG. 2, only the components of the process unit 30*y* for yellow are denoted by reference numerals, and the components for the other colors are not denoted by reference numerals. The process units may also be referred to as the process unit 30 with the use of a representative reference numeral. It should be understood that the description using the representative reference numeral is applied to each of the Y, M, C, and K colors.

In a first embodiment, the process unit 30 is configured as a consumable unit that is replaceable as a single unit. This enables easy replacement of consumables such as the photoconductor drum 13 included in the process unit 30.

The digital multifunction machine 100 further includes an image processing circuit 41 that generates an input signal to the optical scanning unit 11 (see FIG. 3). The image processing circuit 41 processes image data of the document read by the image reader 111 to generate exposure data relating to an exposure pattern of the photoconductor drum 13. The exposure data corresponds to a pattern of an electrostatic latent image to be formed on the surface of the photoconductor drum 13.

Under the control of an image forming controller 133 illustrated in FIG. 3, control is performed such that a toner image of any of Y, M, C, and K is formed on the photoconductor drum 13 through the electrophotographic process of cleaning by the drum cleaner 15, charging by the charging roller 14, exposure by the optical scanning unit 11, and development by the developing unit 12.

A primary transfer roller 16 is disposed at a position contactable with the photoconductor drum 13 of the process unit 30 via the intermediate transfer belt 21. The image forming controller 133 applies a voltage to the primary transfer rollers 16 to transfer the Y, M, C, and K toner images formed on the photoconductor drums 13 onto the intermediate transfer belt 21 in an overlapping manner and delivers the toner images to a position contactable with a secondary transfer unit 23. The image forming controller 133 drives the secondary transfer unit 23 and applies a voltage to transfer the toner images to a print sheet fed from the paper feed tray 18*a* or the like.

A toner concentration sensor 43 is disposed at a position in front of the secondary transfer unit 23 so as to face the intermediate transfer belt 21 moving from the primary transfer rollers 16 to the secondary transfer unit 23. In the first embodiment, the toner concentration sensor 43 is a reflective optical sensor and detects the amount of adhesion of toner of the toner images transferred to the intermediate transfer belt 21.

The image forming controller 133 controls the printer 115 to form a toner patch of each of the Y, M, C, and K colors and detects the concentration of the formed toner patch with the toner concentration sensor 43. Then, the image forming controller 133 adjusts at least any of the voltage applied to the charging roller 14 corresponding to each color, the voltage applied to the developing unit 12, and the intensity of the laser beam emitted from the optical scanning unit 11 to the photoconductor drum 13. By the adjustment, the image quality is adjusted to obtain a desirable image.

In addition, the image forming controller 133 feeds print sheets (storage media) from the paper feed tray 18*a* of the main body, the paper feed trays 18*b*, 18*c*, and 18*d* of the paper feed desk (not illustrated in FIG. 2), and a bypass tray 19 and conveys the print sheets. Note that the bypass tray 19 can be folded and housed in the main body when not in use as illustrated in FIG. 1.

The image forming controller 133 conveys, to a fixing unit 17, the print sheets onto which the toner images are transferred by the secondary transfer unit 23. A heating roller 24 and a pressure roller 25 of the fixing unit 17 heat and pressurize the print sheets passing therebetween to fix the toner images transferred to the print sheets onto the print sheets. The image forming controller 133 drives the fixing unit 17 and controls the heating temperature of the heating roller 24.

The image forming controller 133 causes the print sheets passed through the fixing unit 17 to be discharged to the discharge tray 39*a*. Alternatively, the image forming controller 133 causes the print sheets to be switched back once by a discharge roller 36 and discharged to the discharge tray 39*b* on the right side surface portion. Alternatively, the image forming controller 133 causes the print sheets switched back to be guided to a double-sided conveyance path 37 and returned to the secondary transfer unit 23. Then, the toner images are transferred to the back side of the print sheets, and the print sheets are discharged through the fixing unit 17 to the discharge tray 39*a* or 39*b*.

A power supply 107 supplies power to each portion of the digital multifunction machine 100. For example, an AT power supply, an ATX power supply, an SFX power supply, or the like is used as the power supply 107.

As illustrated in FIG. 3, a controller 110 includes devices such as a processor 121, a RAM 122, and a nonvolatile memory 123 as hardware resources. The processor 121 executes a control program stored in advance in the nonvolatile memory 123 and collaborates with the hardware resources, and thus functions as the controller 110 are exerted. The controller 110 includes an image quality adjuster 131, the image forming controller 133, a separate state determinator 135, and a power supply controller 137.

FIG. 2 illustrates a configuration example of a color multifunction machine that forms a color image by superimposing four-color toner images, but a monochrome multifunction machine that forms a monochrome image is applicable.

In the case of the monochrome multifunction machine, the image forming controller 133 controls the printer 115 to form an adjustment patch. Then, the image forming controller 133 detects the concentration of the formed toner patch with the toner concentration sensor 43, and by adjusting at least any of the voltage applied to the charging roller 14, the voltage applied to the developing unit 12, and the intensity of the laser beam emitted from the optical scanning unit 11 to the photoconductor drum 13, and adjusts the image quality so as to achieve a desirable image.

In addition, the image forming controller 133 forms a toner image of black on the photoconductor drum 13. Then, the image forming controller 133 applies a voltage to a secondary transfer roller 22 of the secondary transfer unit 23 and transfers the toner image of black formed on the photoconductor drum 13 onto a print sheet fed from the paper feed tray 18*a* or the like.

The image quality adjuster 131 controls the printer 115 to form an adjustment toner patch and detects the concentration of the formed toner patch with the toner concentration sensor 43. Then, the image quality adjuster 131 adjusts any of the voltage applied to the charging roller 14, the voltage applied to the developing unit 12, and the intensity of the laser beam emitted from the optical scanning unit 11 to the photoconductor drum 13. By the adjustment, the image quality is adjusted to obtain a desirable image during image formation by the image forming controller 133.

The separate state determinator 135 performs processing relating to determination of whether or not a separate state is canceled when a new process unit 30 in a separate state is mounted in the main body of the digital multifunction machine 100 and a photoconductor drum 13 initially rotates. In addition, the separate state determinator 135 executes performs processing relating to determination of a separate state between the photoconductor drum 13 and the intermediate transfer belt 21 together with the processing above.

The power supply controller 137 is a portion that controls ON/OFF of the power supply 107 based on a command from the controller 110, supplies power to each portion of the digital multifunction machine 100 to start up, and shifts the machine to a standby state or a power-saving state.

Determination Processing of Separate State Between Photoconductor Drum 13 and Intermediate Transfer Belt 21 and Separate State Between Photoconductor Drum 13 and Charging Roller 14

Next, an example of determination processing of a separate state between the photoconductor drum 13 and the intermediate transfer belt 21 and a separate state between the photoconductor drum 13 and the charging roller 14 (hereinafter, also referred to separate state determination processing) will be described with reference to a flowchart.

Figure 4:
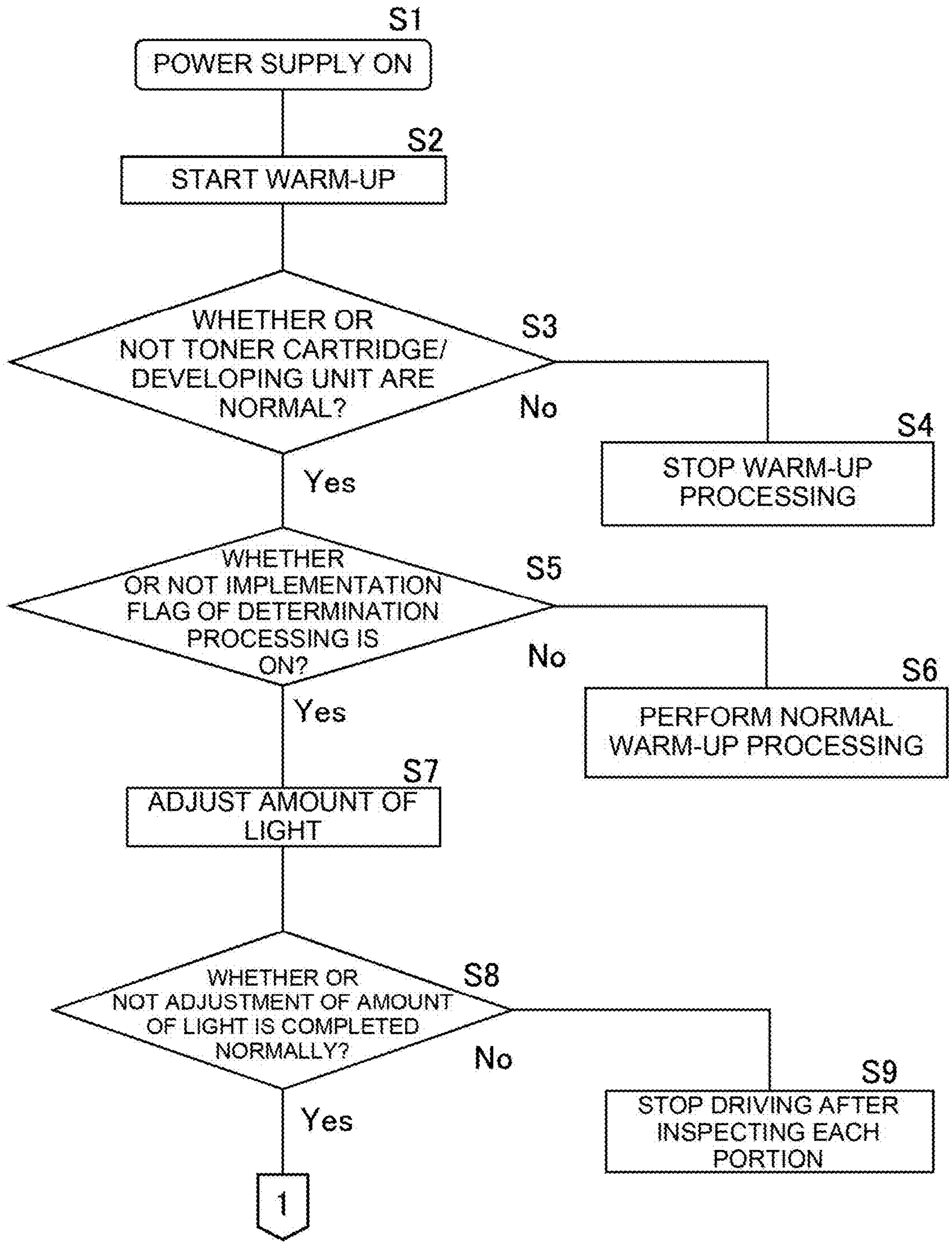
FIG. 4 is a flowchart illustrating an example of an initialization operation in an image forming process including determination processing to be executed by a controller illustrated in FIG. 3 for a separate state between a photoconductor drum and an intermediate transfer belt and a separate state between the photoconductor drum and a charging roller.
Figure 5:
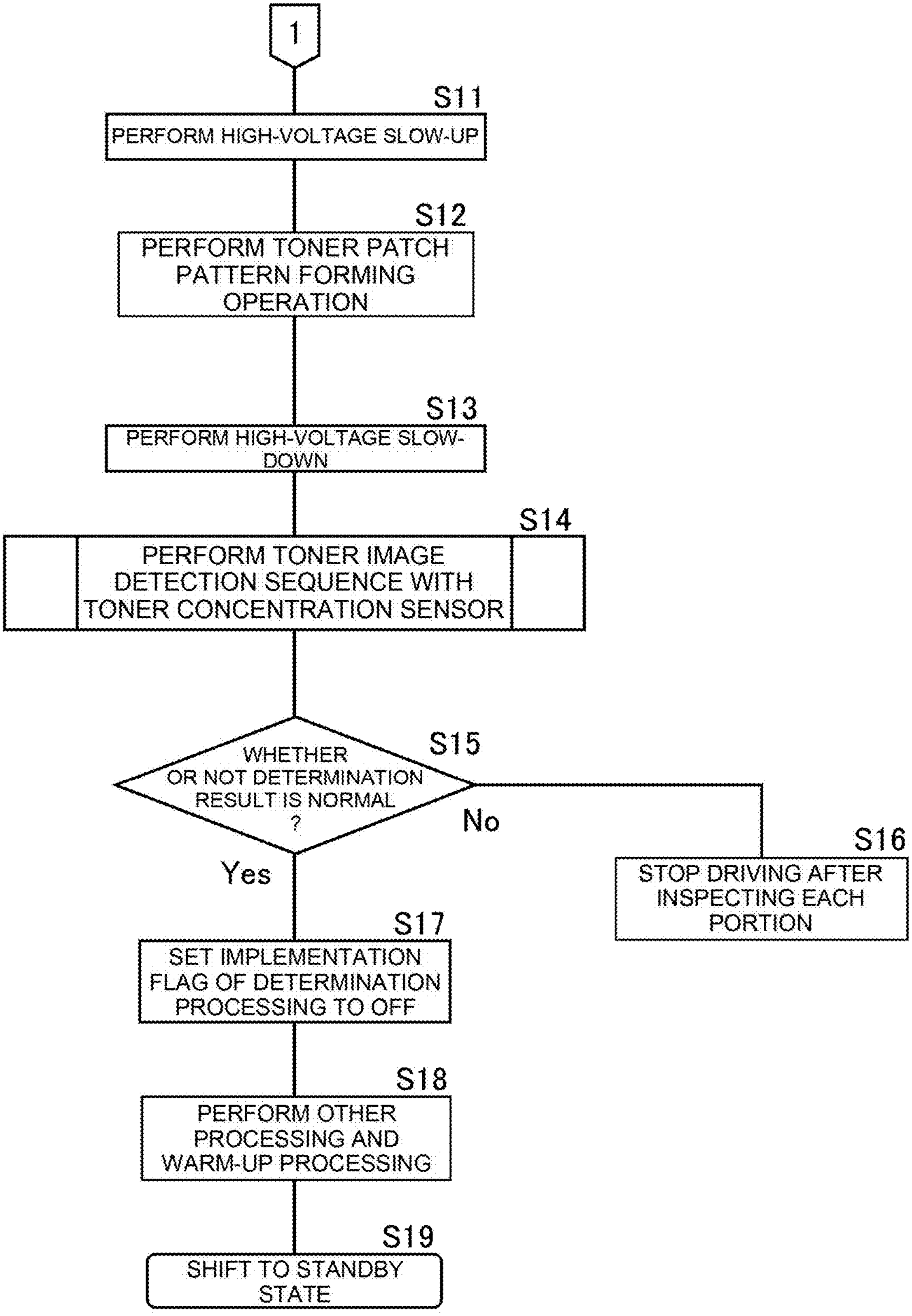
FIG. 5 is the flowchart illustrating the example of the initialization operation in the image forming process including the determination processing to be executed by the controller illustrated in FIG. 3 for the separate state between the photoconductor drum and the intermediate transfer belt and the separate state between the photoconductor drum and the charging roller.

FIGS. 4 and 5 are the flowchart illustrating an example of an initialization operation in an image forming process including determination processing to be executed by the controller illustrated in FIG. 3 for a separate state between the photoconductor drum 13 and the intermediate transfer belt 21 and a separate state between the photoconductor drum 13 and the charging roller 14.

In step S1 of FIG. 4, the digital multifunction machine 100 is powered on, and then the controller 110 supplies power to each portion of the digital multifunction machine 100 (step S1); thereafter, in step S2, the controller 110 starts predetermined warm-up processing (step S2).

In the following step S3, the controller 110 checks states of a toner cartridge and the developing unit 12 to determine whether or not the toner cartridge and the developing unit 12 are normal (step S3).

When the toner cartridge or the developing unit 12 is not normal (No in determination of step S3), in step S4, the controller 110 stops the warm-up processing (step S4).

When the toner cartridge or the developing unit 12 is abnormal and toner supply cannot be properly performed, a toner patch pattern described below cannot be properly formed. Also, when a toner image is too thin to be detected properly, a wrong detection of a non-contact state of the intermediate transfer belt 21 with the photoconductor drum 13 may be made, and thus the state of the toner cartridge/the developing unit is checked as just described.

On the other hand, when the toner cartridge or the developing unit 12 is normal (Yes in determination of step S3), the controller 110 determines in step S5 whether or not an implementation flag of the separate state determination processing is ON (step S5).

Note that since the implementation flag of the separate state determination processing is set to ON at the time of shipment from a factory (at the completion of production process), the separate state determination processing is performed at the time of initial start-up of the digital multifunction machine 100.

Alternatively, by determining based on a welding state of a circuit fuse of each process unit whether or not the machine is new, the separate state determination processing may be performed at the time of initial start-up of the new machine.

The unit state needs to be redetermined after each process unit is maintained, and thus it is assumed that the maintenance counter is cleared after the maintenance work. Accordingly, the separate state determination processing can be performed at the time of the next start-up following the implementation of the maintenance counter clear.

When the implementation flag of the separate state determination processing is OFF (No in determination of step S5), in step S6, the controller 110 performs normal warm-up processing (step S6).

On the other hand, when the implementation flag of the separate state determination processing is ON (Yes in determination of step S5), in step S7, the controller 110 adjusts the amount of light (step S7).

Specifically, the controller 110 applies a reverse bias voltage to the developing unit 12, and then drives and rotates the photoconductor drum 13 and activates the toner concentration sensor 43. Thereafter, at least any of the amount of irradiation light emitted by the toner concentration sensor 43 and the sensitivity at which the toner concentration sensor 43 detects the reflected light is adjusted such that the amount of light reflected from the surface of the photoconductor drum 13 on which a toner image is not formed is within a predetermined range.

In the following step S8, the controller 110 determines whether or not the adjustment of the amount of light is completed normally (step S8).

In other words, the controller 110 determines whether or not the amount of light detected by the toner concentration sensor 43 can be adjusted within the predetermined range.

When the adjustment of the amount of light is not completed normally (No in determination of step S8), in step S9, the controller 110 inspects each portion relating to the adjustment of the amount of light of the process unit 30 and then stops driving of the process unit 30 (step S9). Thereafter, the abnormality of the toner concentration sensor 43 is displayed, for example, on the operation acceptor 105 to notify a user of the abnormality and urge the user to take action, and the processing is terminated.

Thus, a wrong detection can be avoided without being able to normally determine the toner image when the toner concentration sensor 43 is abnormal.

On the other hand, when the adjustment of the amount of light is completed normally (Yes in determination of step S8), in step S11 of FIG. 5, the controller 110 performs high-voltage slow-up (step S11).

Specifically, the controller 110 causes the image quality adjuster 131 to apply a bias voltage to the charging roller 14 and the developing unit 12 up to the level predetermined for image quality adjustment. Examples of the bias voltage are −600 V for the charging roller 14 and −450 V for the developing unit 12.

In the following step S12, the controller 110 performs a toner patch pattern forming operation (step S12).

The controller 110 uses the optical scanning unit 11 to cause the photoconductor drum 13 to be partially exposed and forms a patch image having a predetermined pattern (a toner patch).

Afterward, in step S13, the controller 110 performs high-voltage slow down (step S13).

Next, in step S14, the controller 110 performs toner image detection sequence with the toner concentration sensor 43 (step S14).

In other words, the controller 110 detects the amount of adhesion (concentration) of toner of the toner patch formed in step S12, with the toner concentration sensor 43.

Note that processing of the toner image detection sequence with the toner concentration sensor 43 will be described in detail in the description of a flowchart of FIG. 10.

Next, in step S15, the controller 110 determines whether or not the determination result is normal (step S15).

When the determination of step S15 is not normal (No in determination of step S15), in step S16, the controller 110 inspects each portion of the process unit 30 and then stops driving of the process unit 30 (step S16).

In this case, of operations of the printer 115, operations relating to other functions without image formation, for example, generation of image data by scanning, etc. can be utilized without being stopped.

On the other hand, when the determination of step S15 is normal (Yes in determination of step S15), in step S17, the controller 110 sets the implementation flag of the separate state determination processing to OFF (step S17).

In the following step S18, the controller 110 performs other processing and the warm-up processing (step S18); thereafter, in step S19, the controller 110 shifts the machine to the standby state (step S19).

FIG. 6 is an explanatory diagram illustrating an example of detection of a toner image pattern to be executed by the controller 110 illustrated in FIG. 3.

Figures 6A, 6B, 6C, 6D:
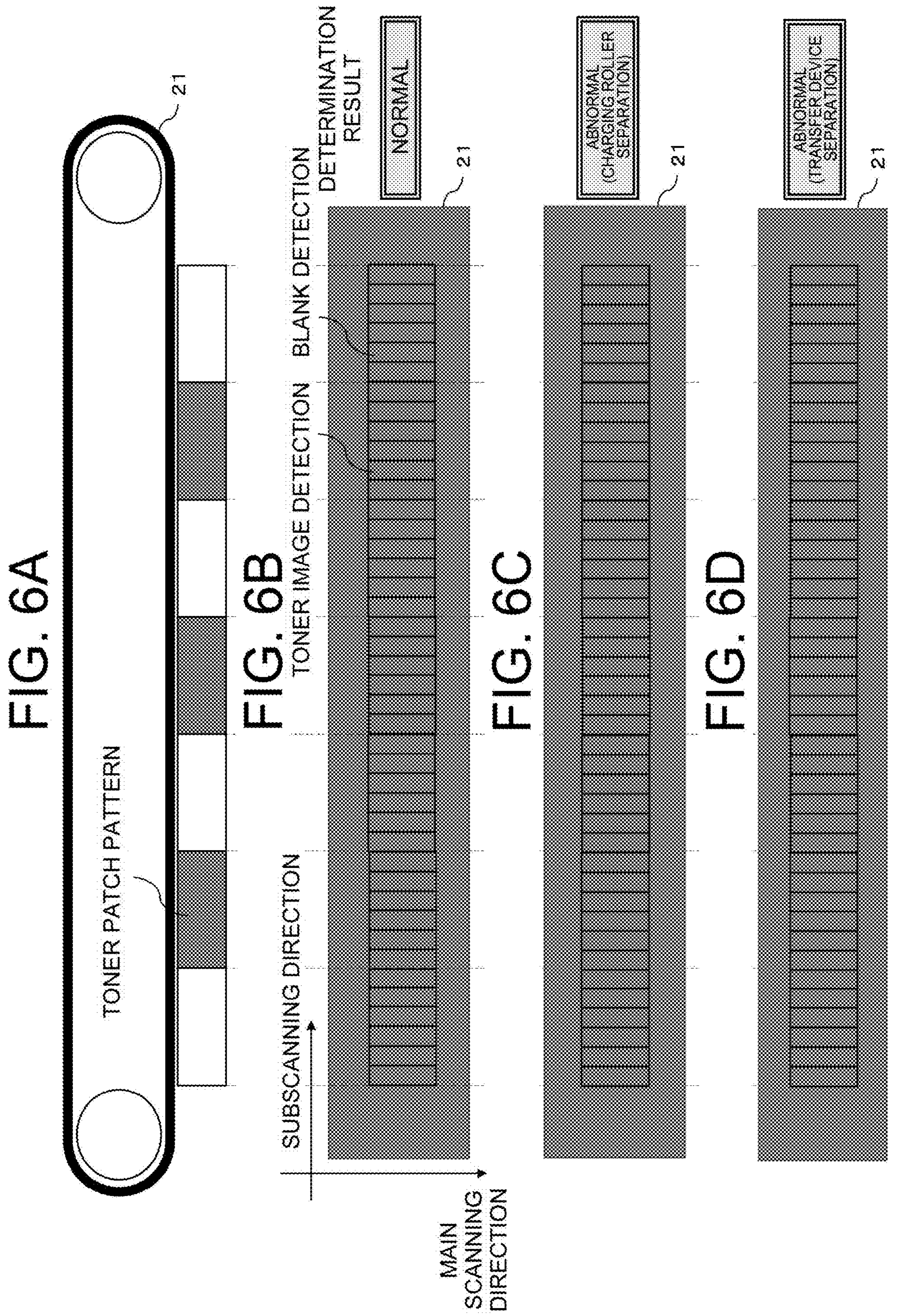
FIGS. 6A-6D are each an explanatory diagram illustrating an example of determination of a toner image pattern to be executed by the controller illustrated in FIG. 3.

As illustrated in FIG. 6A, the controller 110 forms a striped toner patch pattern in which the predetermined number of toner images having a predetermined width in a main scanning direction are repeatedly arranged at predetermined intervals in a subscanning direction.

The toner patch pattern is detected by the toner concentration sensor 43, and whether or not the mounted state of the intermediate transfer belt 21 and the separate state between the charging roller 14 and the photoconductor drum 13 are normal is determined based on the obtained toner image pattern.

Table 1 is a table that indicates an example of a method for determining contact states of the intermediate transfer belt 21 and the charging roller 14 with the photoconductor drum 13 based on the toner patch pattern detected as just described.

TABLE 1

| Detected toner patch pattern | Intermediate transfer belt | Charging roller |
|---|---|---|
| Toner images and blanks are alternatively repeated | OK: contact | OK: contact |
| Toner images are continuous and blanks are not confirmed | OK: contact | NG: separate |
| Blanks are continuous and toner images are not confirmed | NG: separate | ??: uncertain |

As illustrated in FIG. 6B, when a pattern in which "toner images and blanks are alternatively repeated" is detected, it is determined that both the intermediate transfer belt 21 and the charging roller 14 are normally in contact with the photoconductor drum 13.

Figure 7:
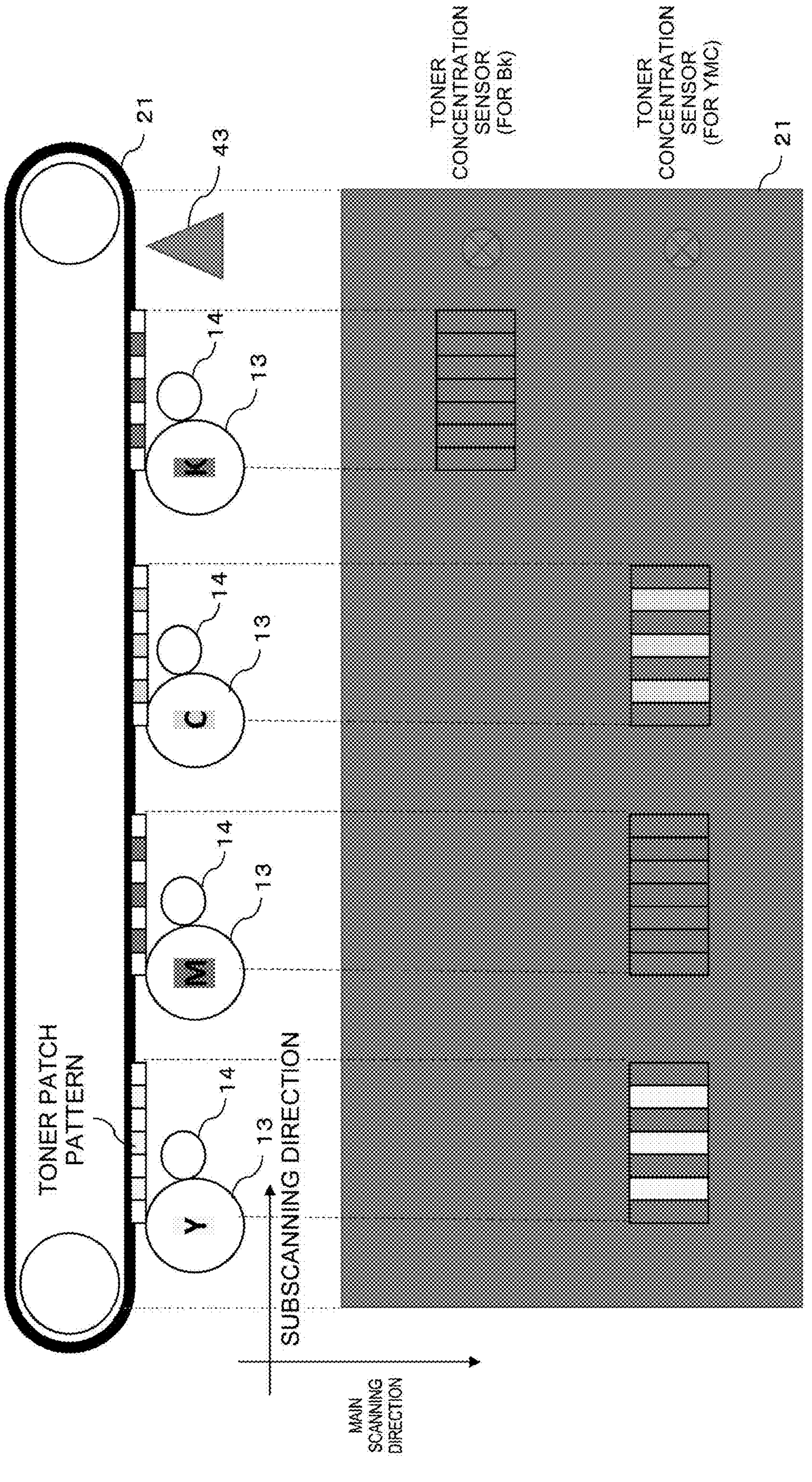
FIG. 7 is an explanatory diagram illustrating an example of detection with a toner concentration sensor of a toner image pattern to be executed by the controller illustrated in FIG. 3.

FIG. 7 is an explanatory diagram illustrating an example of detection with the toner concentration sensor 43 of a toner image pattern to be executed by the controller 110 illustrated in FIG. 3.

As illustrated in FIG. 7, the controller 110 forms striped toner patch patterns for the respective YMCK colors on the intermediate transfer belt 21.

Specifically, the striped patch pattern in which blanks and toner images of each color are alternatively arranged is formed. The main scanning direction may have the width that can be read by sensors. In the example of FIG. 7, the sensors for K and for YMC, serving as the toner concentration sensor 43 are disposed in different locations in the main scanning direction.

In the example of FIG. 7, the pattern in which "toner images and blanks are alternatively repeated" is detected for each of the YMCK colors; therefore, it is determined that both the intermediate transfer belt 21 and the charging roller 14 are normally in contact with the photoconductor drum 13.

Also, as illustrated in FIG. 6C, when a pattern in which "tonner images are continuous and blanks are not confirmed" is detected, it is determined that the charging roller 14 is separated from the photoconductor drum 13 while the intermediate transfer belt 21 is normally in contact with the photoconductor drum 13.

Figure 8:
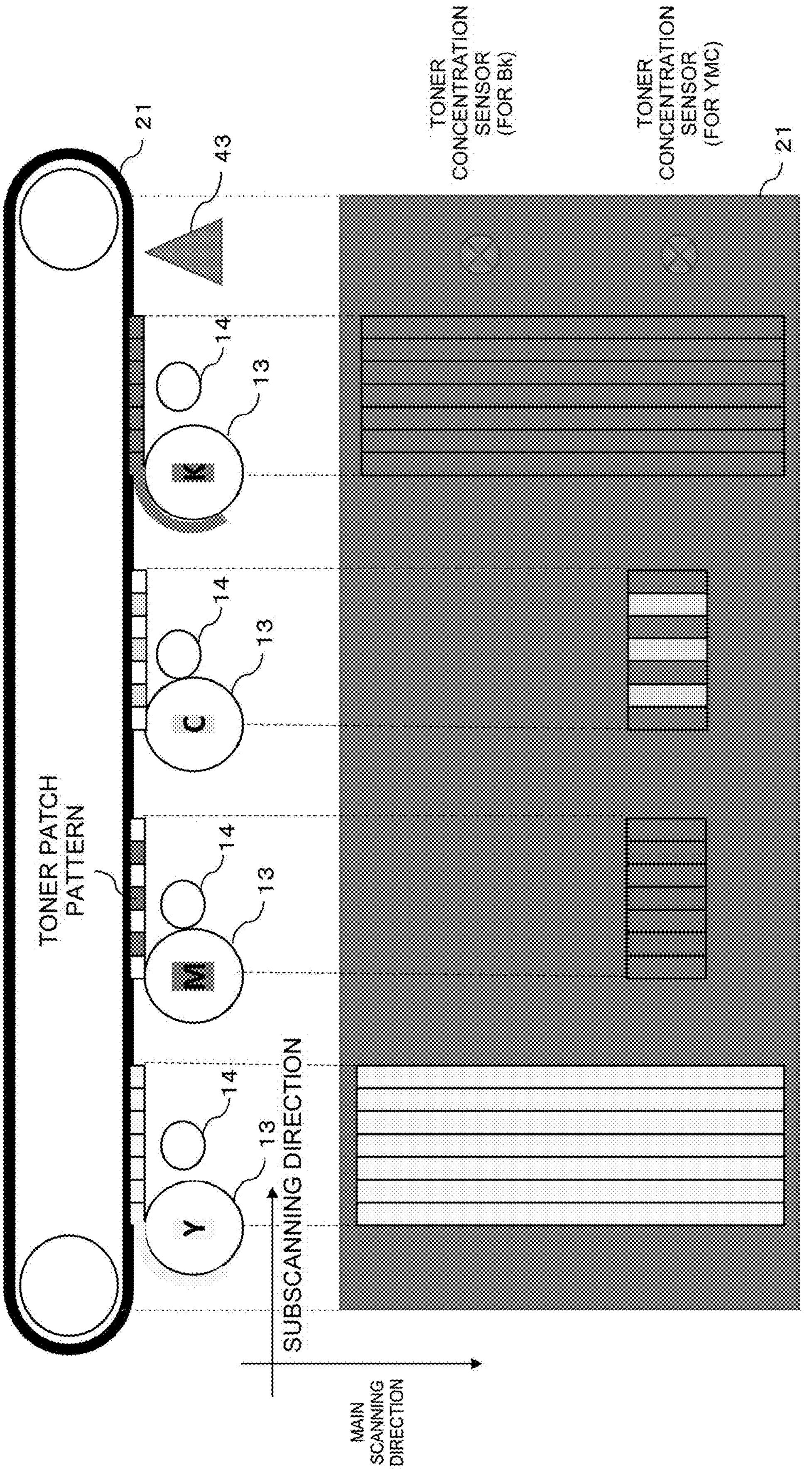
FIG. 8 is an explanatory diagram illustrating another example of detection with the toner concentration sensor of a toner image pattern to be executed by the controller illustrated in FIG. 3.

FIG. 8 is an explanatory diagram illustrating another example of detection with the toner concentration sensor 43 of a toner image pattern to be executed by the controller 110 illustrated in FIG. 3.

In the example of FIG. 8, the pattern in which "toner images and blanks are alternatively repeated" is detected in each of the MC colors; therefore, it is determined that both the intermediate transfer belt 21 and the charging roller 14 are normally in contact with the photoconductor drum 13.

On the other hand, the pattern in which "tonner images are continuous and blanks are not confirmed" is detected for each of the YK colors, it is determined that the charging roller 14 is separated from the photoconductor drum 13 while the intermediate transfer belt 21 is normally in contact with the photoconductor drum 13.

On the other hand, as illustrated in FIG. 6D, when a pattern in which "blanks are continuous and toner images are not confirmed" is detected, it is determined that the intermediate transfer belt 21 is unmounted and whether or not the charging roller 14 is mounted on the photoconductor drum 13 is uncertain.

Figure 9:
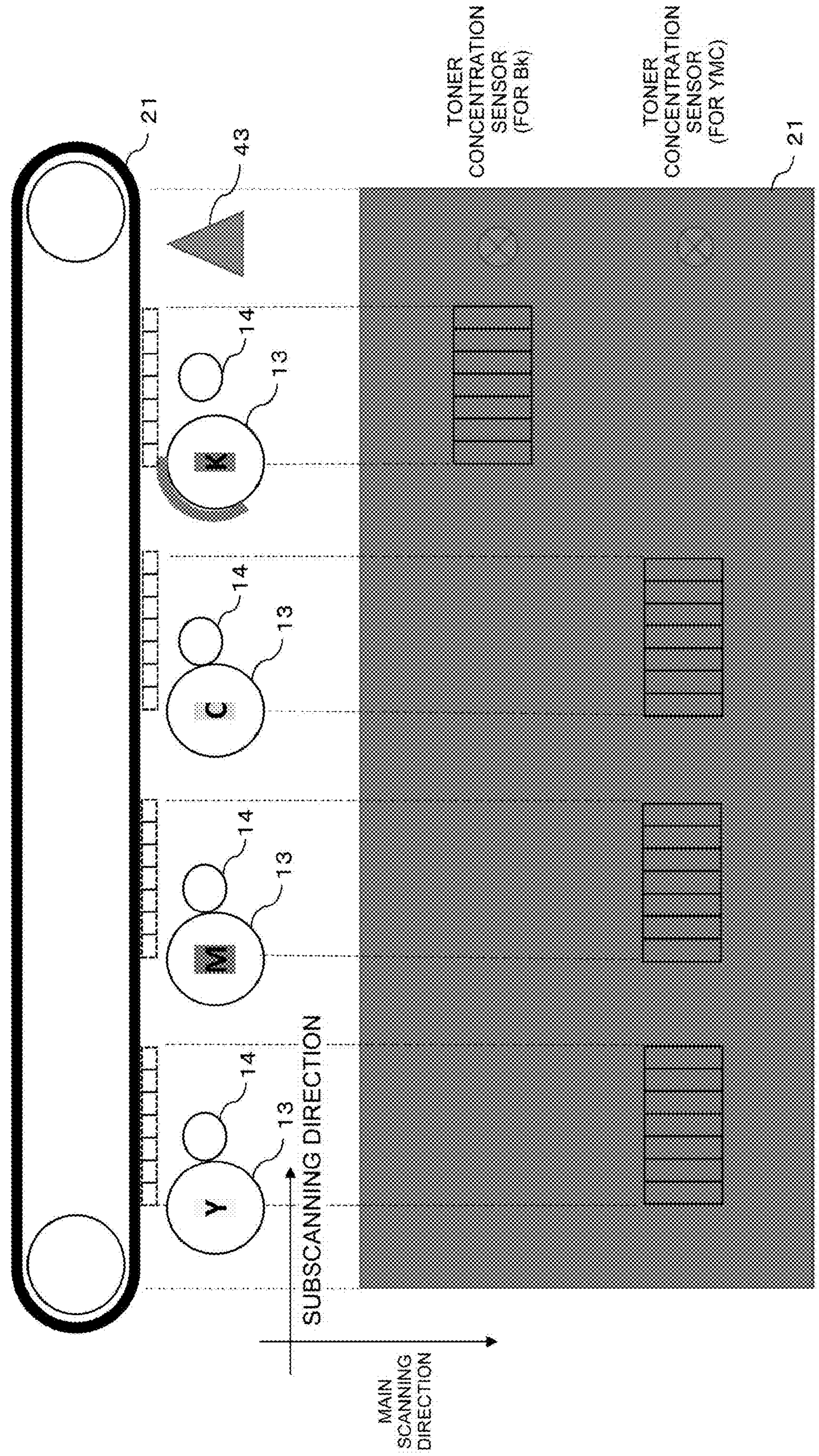
FIG. 9 is an explanatory diagram illustrating another example of detection with the toner concentration sensor of a toner image pattern to be executed by the controller illustrated in FIG. 3.

FIG. 9 is an explanatory diagram illustrating another example of detection with the toner concentration sensor 43 of a toner image pattern to be executed by the controller 110 illustrated in FIG. 3.

In the example of FIG. 9, the pattern in which "blanks are continuous and toner images are not confirmed" is detected for each of the YMCK colors; therefore, it is determined that the intermediate transfer belt 21 is separated from the photoconductor drum 13 and whether or not the charging roller 14 is in contact with the photoconductor drum 13 is uncertain.

Note that the toner patch pattern made of any pattern is perfectly acceptable as long as a difference between a toner image and a blank state can be determined.

Further, a plurality of toner images having different concentrations are formed by changing a high-pressure value and the toner images are read, and image adjustment may be performed based on the detected toner concentration value (a high-voltage output value in charging or image development is adjusted based on the toner concentration value).

Furthermore, when lubricant of the photoconductor drum 13 or the intermediate transfer belt 21 is insufficient due to the state of a new article, the formation of a plurality of toner images in the maximum scanning width may also serve as the role of supply of the lubricant.

Figure 10:
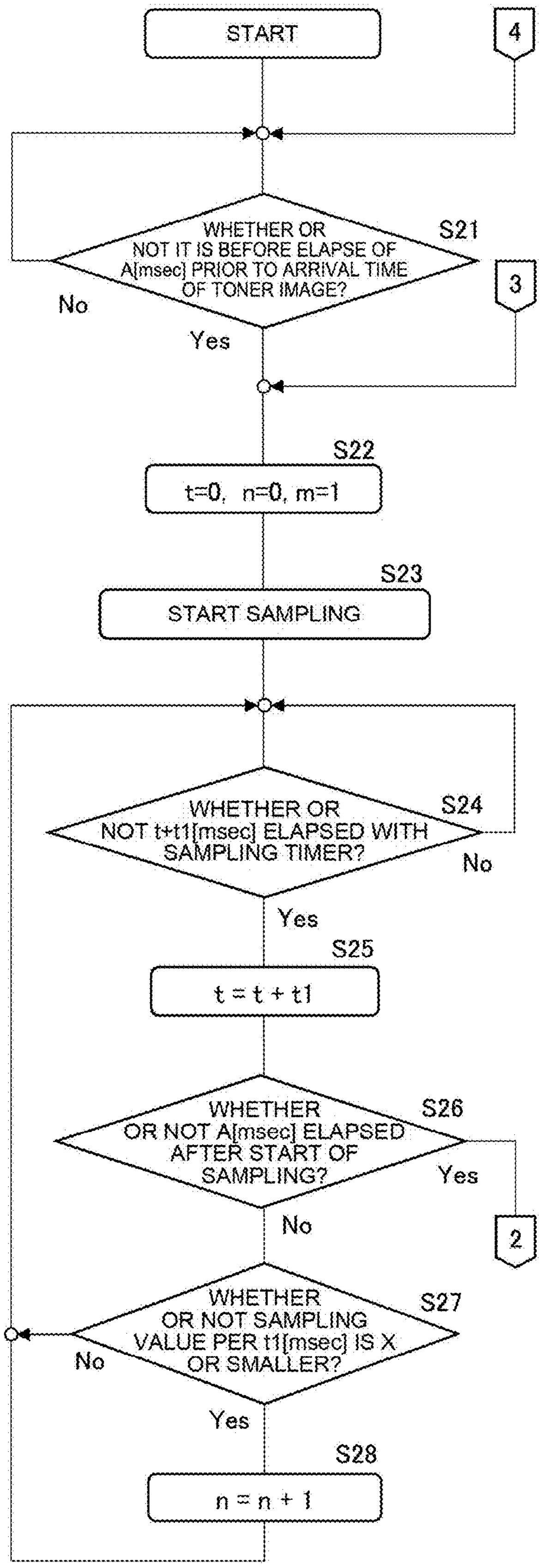
FIG. 10 is a flowchart illustrating an example of a toner image detection sequence with the toner concentration sensor to be executed by the controller in FIG. 3.
Figure 12:
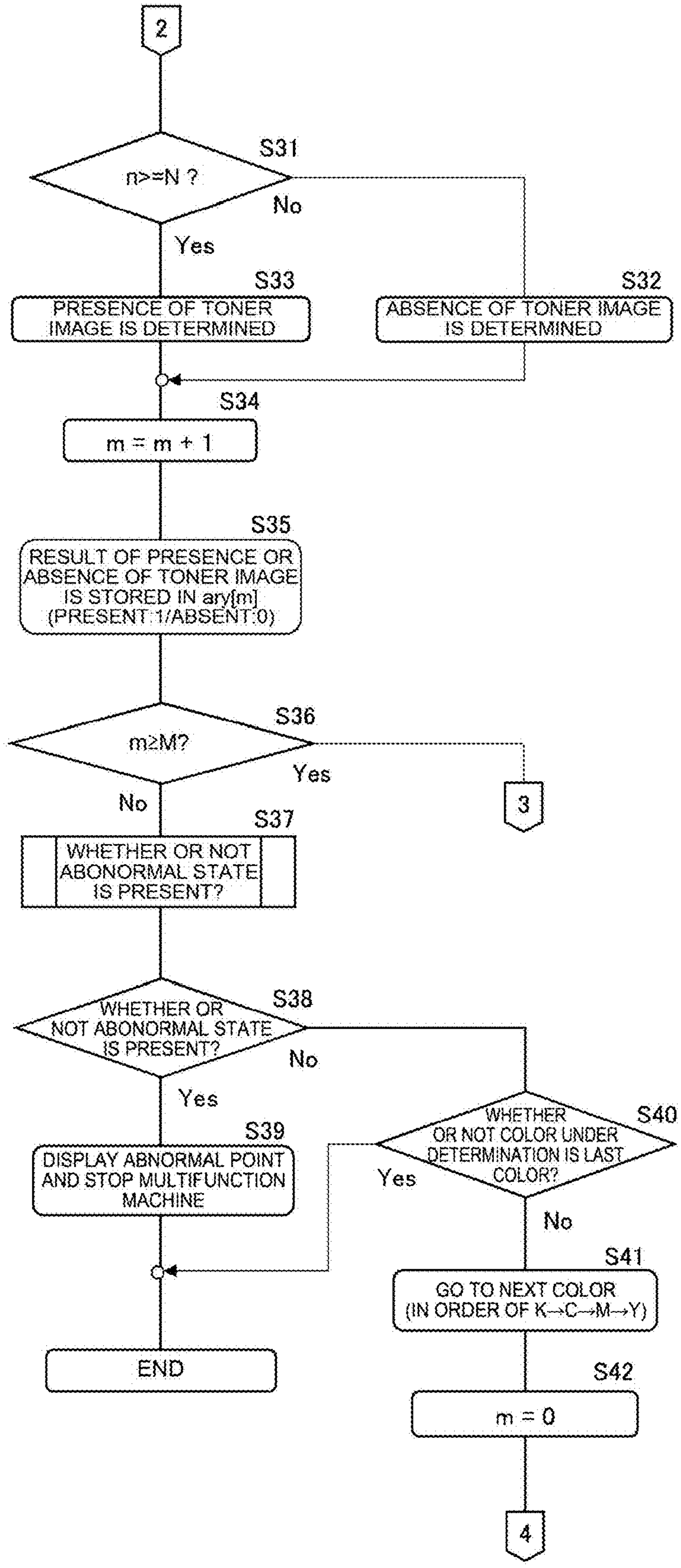
FIG. 12 is the flowchart illustrating the example of the toner image detection sequence with the toner concentration sensor to be executed by the controller in FIG. 3.

FIGS. 10 and 12 is a flowchart illustrating an example of the toner image detection sequence (FIG. 5, S14) with the toner concentration sensor 43 to be executed by the controller 110 in FIG. 3.

In step S21 of FIG. 10, the controller 110 determines whether or not it is before the elapse of A [msec] prior to the expected arrival time of a toner image (step S21).

When it is not before the elapse of A [msec] prior to the expected arrival time of a toner image (No in determination of step S21), the controller 110 repeats the determination of step S21. A is, for example, 36 [msec].

On the other hand, when it is before the elapse of A [msec] prior to the expected arrival time of a toner image (Yes in step S21), in step S22, the controller 110 sets t=0, n=0, and m=1.

Figure 11:
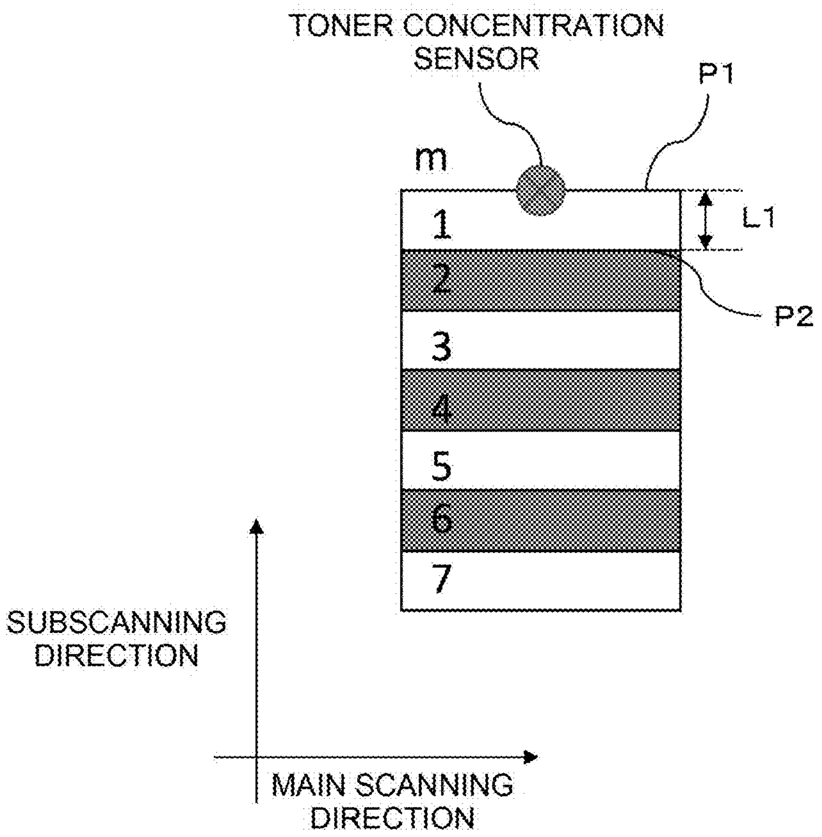
FIG. 11 is an explanatory diagram illustrating an example of a positional relationship between the toner concentration sensor and the toner image pattern in the toner image detection sequence with the toner concentration sensor to be executed by the controller illustrated in FIG. 3.

FIG. 11 is an explanatory diagram illustrating an example of a positional relationship between the toner concentration sensor 43 and the toner image pattern in the toner image detection sequence with the toner concentration sensor 43 to be executed by the controller 110 illustrated in FIG. 3.

At the timing at which the determination of step S21 in FIG. 10 becomes Yes, the center of detection position of the toner concentration sensor 43 is located at a tip end P1 of the toner image pattern corresponding to 1 to 7 of the value of m as illustrated in FIG. 11.

In the example of FIG. 11, P1 is the reached position of the toner concentration sensor 43 at the timing "before the elapse of A [msec] prior to the expected arrival time of a toner image" in step S21 of FIG. 10.

P2 is the reached position of the toner concentration sensor 43 at the timing of "the expected arrival time of a toner image" in step S21 of FIG. 10.

L1 is the distance traveled by the intermediate transfer belt in A [msec].

In the example of FIG. 11, rectangular small regions assigned with 1 to 7 as the value of m each have the width of L1 in the subscanning direction.

L1 is, for example, 5.4 mm (when the belt traveling speed is 150 [mm/sec]).

Here, t indicates the elapsed time [msec] after the start of sampling.

n indicates the number of times that the detection value detected by the toner concentration sensor 43, which is a threshold X or smaller is continuously recorded.

Next, in step S23 of FIG. 10, the controller 110 starts sampling (step S23).

Subsequently, in step S24, the controller 110 determines whether or not t+t1 [msec] has elapsed with a sampling timer (step S24).

t1 is, for example, 1 [msec].

When t+t1 [msec] has not elapsed with the sampling timer (No in determination of step S24), the controller 110 repeats the determination of step S24.

On the other hand, when t+t1 [msec] has elapsed with the sampling timer (Yes in determination of step S24), the controller 110 replaces t [msec] with t+t1 [msec].

Next, in step S26, the controller 110 determines whether or not A [msec] has elapsed after the start of sampling (step S26).

When A [msec] has not elapsed after the start of sampling (No in determination of step S26), in step S27, the controller 110 determines whether or not sampling per t1 [msec] is the threshold X or smaller (step S27).

When sampling per t1 [msec] is the threshold X or smaller (Yes in determination of step S27), the controller 110 determines that a portion is the location to which the toner is adhered, and in step S28, the controller 110 replaces n with n+1 (step S28).

Thereafter, the controller 110 returns the processing to step S24.

On the other hand, when sampling per t1 [msec] is greater than the threshold X (No in determination of step S27), the controller 110 determines that a portion is not the location to which the toner is adhered (a portion is a blank), and the controller 110 returns the processing to step S24.

Next, in step S31 of FIG. 12, the controller 110 determines whether or not n is the predetermined maximum number N or greater (step S31).

When n is less than the predetermined maximum number N (No in determination of step S31), in step S32, the controller 110 determines that a toner image is absent (step S32).

On the other hand, when n is greater than the predetermined maximum number N (Yes in determination of step S31), in step S33, the controller 110 determines that a toner image is present (step S33). The maximum number N is, for example, 30.

After the processing of step S32 or S33, in step S34, the controller 110 replaces the number of times of determination on toner image m with m+1 (step S34).

Next, in step S35, the controller 110 stores the result of presence or absence of a toner image in the toner image presence/absence result array ary [m] (step S35). In other words, when a toner image is present, 1 is stored in ary [m], and when a toner image is absent, 0 is stored in ary [m].

Next, in step S36, the controller 110 determines whether or not the number of times of determination on toner image m is less than the maximum number M (step S36). The maximum number M is, for example, 7.

When the number of times of determination on toner image m is less than the maximum number M (No in determination of step S36), the controller 110 returns the processing to step S23.

On the other hand, when the number of times of determination on toner image m is the maximum number M or greater (Yes in determination of step S36), in step S37, the controller 110 determines a toner image pattern (step S37).

Next, in step S38, the controller 110 determines whether or not an abnormal state is present (step S38).

When an abnormal state is present (Yes in determination of step S38), in step S39, the controller 110 causes the abnormal point to be displayed, stops the digital multifunction machine 100 (step S39), and thereafter terminates the processing.

On the other hand, when an abnormal state is absent (No in determination of step S38), in step S40, the controller 110 determines whether or not the color under determination is the last color in the predetermined determination order (step S40).

For example, the determination order is, for example, black (K), cyan (C), magenta (M), and yellow (Y), the last color is yellow (Y).

When the color under determination is the last color in the predetermined determination order (Yes in determination of step S40), the controller 110 terminates the processing.

On the other hand, when the color under determination is not the last color in the predetermined determination order (No in determination of step S40), in step S41, the controller 110 starts processing for the next color in the predetermined determination order (step S41).

Next, in step S42, the controller 110 resets the number of times of determination on toner image m to 0 and returns the processing to step S21 of FIG. 10.

Figure 13:
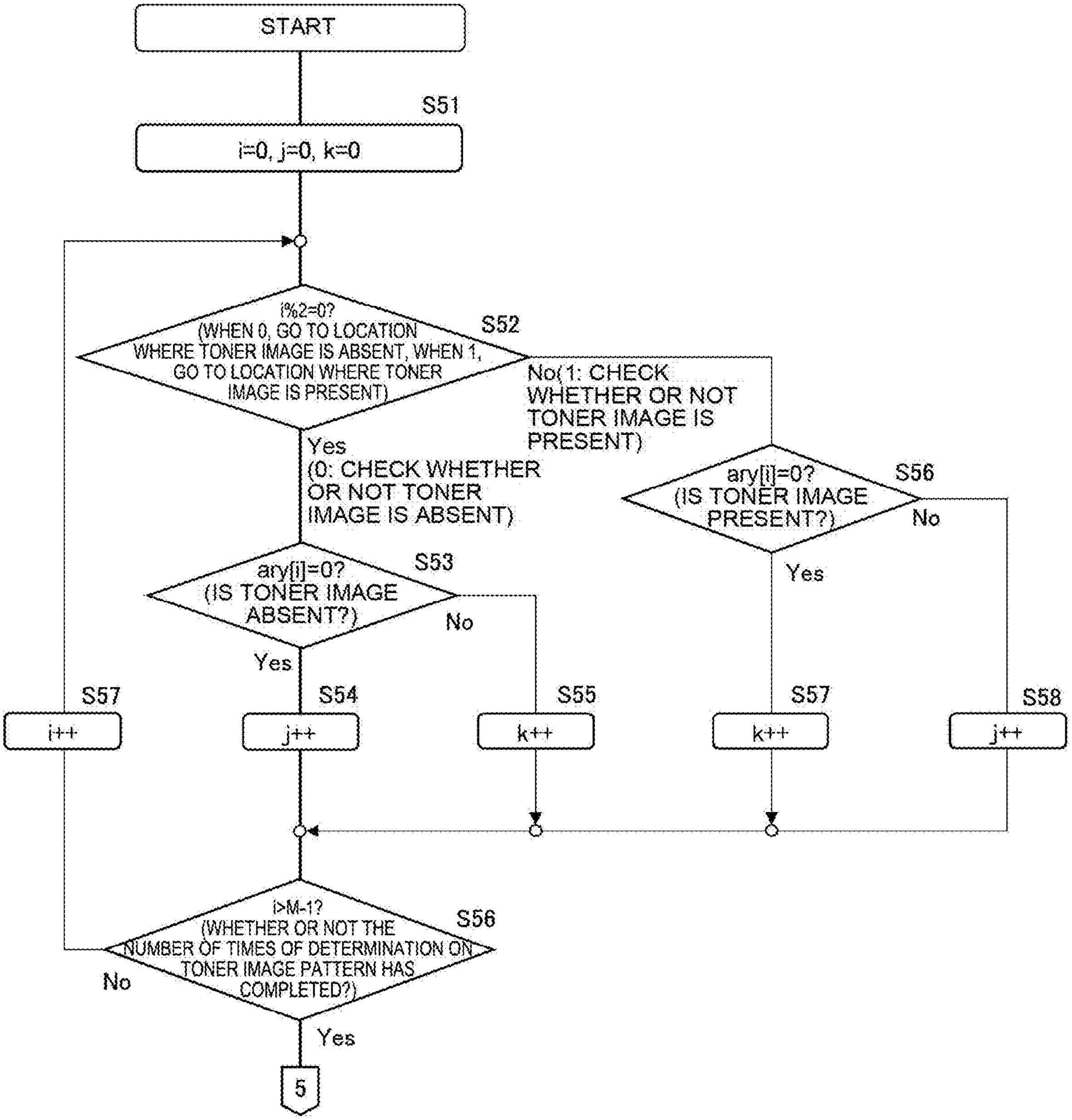
FIG. 13 is a flowchart illustrating an example of determination of the toner image pattern to be executed by the controller illustrated in FIG. 3.

FIG. 13 is a flowchart illustrating an example of determination of the toner image pattern to be executed by the controller 110 illustrated in FIG. 3.

Figure 14:
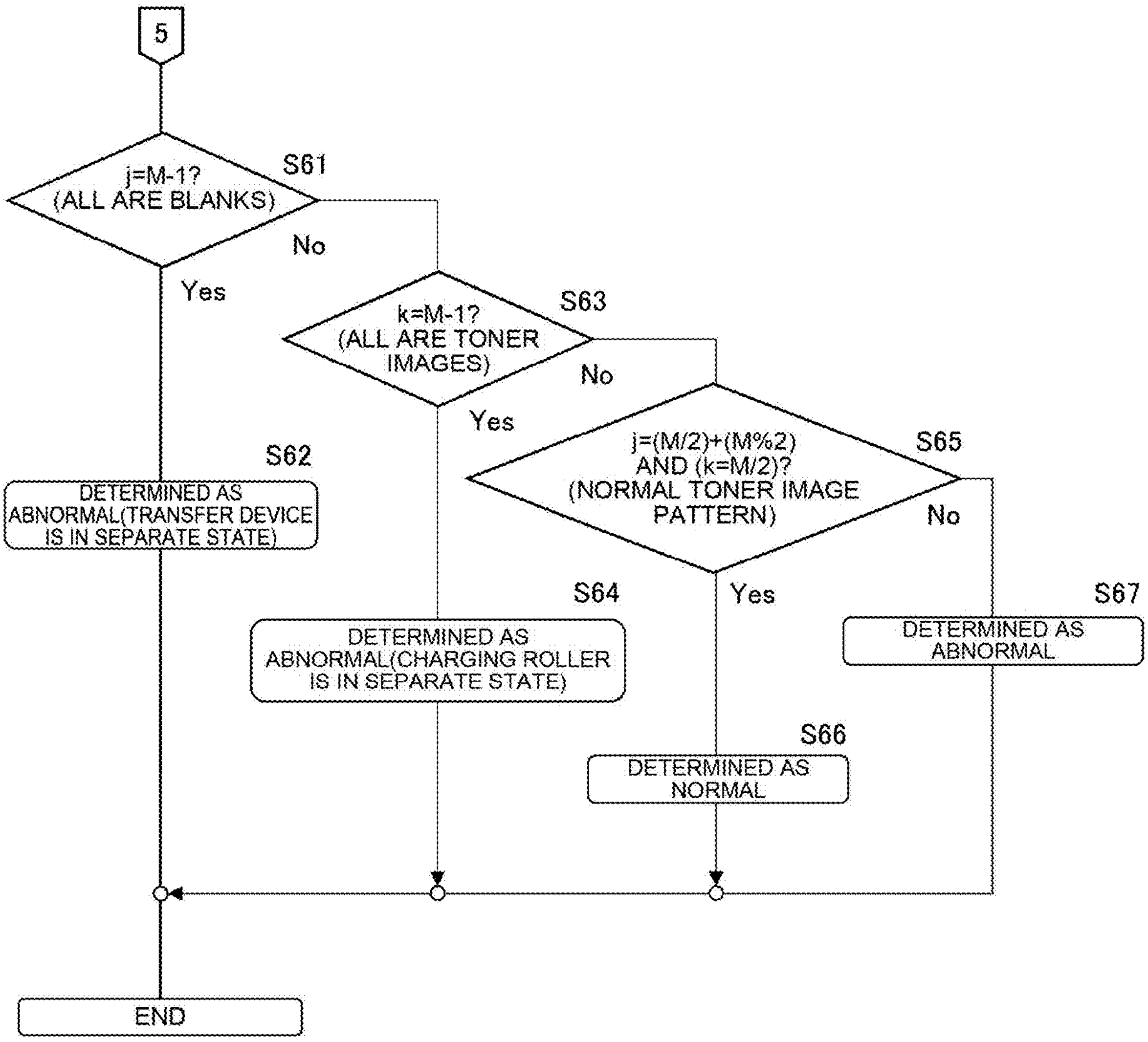
FIG. 14 is the flowchart illustrating the example of determination of the toner image pattern to be executed by the controller illustrated in FIG. 3.

FIG. 14 is the flowchart illustrating the example of determination of the toner image pattern to be executed by the controller 110 illustrated in FIG. 3.

FIGS. 13 and 14 illustrate the processing in step S37 of FIG. 12 in detail.

In step S51 of FIG. 13, parameters i, j, and k are reset to 0 (step S51).

Next, in step S52, the controller 110 determines whether a remainder is 0 after dividing i by 2 (step S52).

When a remainder is 0 after dividing i by 2 (Yes in determination of step S52), in step S53, the controller 110 checks whether or not a toner image is absent, that is, determines whether or not the result is ary[i]=0 (step S53).

When ary[i]=0 (a toner image is absent) (Yes in determination of step S53), in step S54, the controller 110 adds 1 to the value of j (step S54).

On the other hand, when ary[i]=1 (a toner image is present) (No in determination of step S53), in step S55, the controller 110 adds 1 to the value of k (step S55).

After the processing of step S54 or S55, in step S56, the controller 110 determines whether or not i is greater than M−1, that is, whether or not the number of times of determination on toner image pattern has been completed (step S56).

When the number of times of determination on toner image pattern has not been completed (No in determination of step S56), in step S57, the controller 110 adds 1 to the value of i (step S57) and then returns the processing to the determination of step S52.

On the other hand, when the number of times of determination on toner image pattern has been completed (Yes in determination of step S56), the controller 110 performs the determination of step S61 of FIG. 14.

Meanwhile, in the determination of step S52, when a remainder is not 0 after dividing i by 2 (No in determination of step S52), in step S56, the controller 110 checks whether or not a toner image is present, that is, determines whether the result is ary[i]=1 (step S56).

When ary[i]=1 (a toner image is present) (Yes in determination of step S56), in step S57, the controller 110 adds 1 to the value of k (step S57).

On the other hand, when ary[i]=0 (a toner image is absent) (No in determination of step S56), in step S58, the controller 110 adds 1 to the value of j (step S58).

After the processing of step S57 or S58, the controller 110 performs the determination of step S56.

In step S61 of FIG. 14, the controller 110 determines whether or not all are blanks (j=M−1) (step S61).

When all are blanks (Yes in determination of step S61), in step S62, the controller 110 determines that the transfer device is in a separate state, in an abnormal state (step S62), and then terminates the processing.

On the other hand, when all are not blanks (No in determination of step S61), in step S63, the controller 110 determines whether or not all are toner images (k=M−1) (step S63).

When all are toner images (Yes in determination of step S63), in step S64, the controller 110 determines that the charging roller is in a separate state, in an abnormal state (step S64), and then terminates the processing.

On the other hand, when all are not toner images (No in determination of step S63), in step S65, the controller 110 determines whether or not toner images are normal (j=(M/2)+ (m % 2) and k=M/2) (step S65).

Here, the operator "/" means that truncating the decimal places because variables i, j, and k are integral type. For example, when the maximum number M is 7, M/2=3.

In addition, the operator "%" means a remainder. For example, when the maximum number M is 7, M % 2=1.

When toner images are normal (Yes in determination of step S65), in step S66, the controller 110 determines normality and terminates the processing (step S66).

On the other hand, when toner images are not normal (No in determination of step S65), in step S67, the controller 110 determines abnormality and terminates the processing (step S67).

Note that when abnormality is determined in step S67, contact states of the photoconductor drum 13, the charging roller 14, and the intermediate transfer belt 21 are uncertain, and thus the controller 110 may re-perform separate state determination from the beginning and reconfirm.

As described above, the digital multifunction machine 100 capable of determining not only a contact state between the photoconductor drum 13 and the charging roller 14 but also a contact state between the photoconductor drum 13 and the intermediate transfer belt 21 more effectively than a known digital multifunction machine can be attained.

The aspect of the present disclosure also includes a combination of any of a plurality of aspects described above.

In addition to the aforementioned embodiments, the present disclosure may include various modifications. Such modifications should not be construed as falling outside the scope of the present disclosure. The present disclosure should include meanings equivalent to the scope of the claims and all modifications within the scope.

What is claimed is:

1. An image forming apparatus, comprising:

an image forming section including a photoreceptor, a charging section that comes into contact with the photoreceptor to charge the photoreceptor, an exposure section that forms an electrostatic latent image on the photoreceptor, a developing section that supplies toner to the photoreceptor to form a toner image corresponding to the electrostatic latent image, a transfer section that transfers the toner image to a storage medium, a toner concentration sensor that detects a concentration of the toner image transferred to the transfer section, and a fixing section that thermally fixes the toner image to the storage medium; and one or more controllers that control the image forming section, wherein, at a time of start-up of the image forming section, the one or more controllers perform determination processing by which both a first contact state between the photoreceptor and the transfer section and a second contact state between the photoreceptor and the charging section are determined, when determining that the photoreceptor is in the first contact state with the transfer section and the photoreceptor is in the second contact state with the charging section, the one or more controllers determine normality and start up the image forming section, and then shift the image forming apparatus to a predetermined standby state, when determining that the photoreceptor is not in the first contact state with the transfer section or the photoreceptor is not in the second contact state with the charging section, the one or more controllers determine that an abnormality has occurred and limit an operation of the image forming section to a predetermined operation, and in the determination processing, the one or more controllers control the charging section, the exposure section, the developing section, and the transfer section to transfer a predetermined patch toner image to the transfer section, and then cause the toner concentration sensor to detect a concentration of the predetermined patch toner image, and determine, based on a detection result, the first contact state between the photoreceptor and the transfer section and the second contact state between the photoreceptor and the charging section.

2. The image forming apparatus according to claim 1, wherein, when determining the normality as a result of the determination processing, the one or more controllers do not perform the determination processing from a next start-up of the image forming apparatus, and when determining that the abnormality has occurred, the one or more controllers perform the predetermined determination processing from the next start-up of the image forming apparatus.

3. The image forming apparatus according to claim 1, wherein the predetermined patch toner image includes a striped pattern in which a predetermined number of toner images having a predetermined width in a main scanning direction are repeatedly arranged at predetermined intervals in a subscanning direction.

4. The image forming apparatus according to claim 3, wherein when toner images and blanks are alternately repeated in the striped pattern of the predetermined patch toner image detected by the toner concentration sensor, the one or more controllers determine the normality, when only the toner images are continuous and the blanks are not confirmed, the one or more controllers determine that an abnormality of no contact of the charging section with the photoreceptor has occurred, and when only the blanks are continuous and the toner images are not confirmed, the one or more controllers determine that an abnormality of an unmounted state of the transfer section has occurred.

5. The image forming apparatus according to claim 1, wherein the image forming section forms images according to toner images of a plurality of colors, when supplying power to the image forming section for start-up, the one or more controllers perform the determination processing of further determining both a mounted state of the transfer section and the second contact state between the photoreceptor and the charging section for the toner images of respective colors, and when determining, as a result of the determination processing, that an abnormality has occurred in only one color image, the one or more controllers do not start up the image forming section or limit the operation of the image forming section to the predetermined operation.

* * * * *